INVENTORS
Paul Rauhut
Johann Glavitsch
Robert Cuny
BY Pierce, Scheffler & Parker
Attorneys

United States Patent Office 3,471,708
Patented Oct. 7, 1969

3,471,708
ROTARY TRANSFORMER FOR COUPLING MULTIPHASE SYSTEMS HAVING A SMALL FREQUENCY DIFFERENCE
Paul Rauhut, Ennetbaden, Johann Glavitsch, Nussbaumen, and Robert Cuny, Wettingen, Switzerland, assignors to Aktiengesellschaft Brown, Boveri & Cie., Baden, Switzerland, a joint-stock company
Filed July 18, 1966, Ser. No. 565,798
Claims priority, application Switzerland, July 19, 1965, 10,086/65; Oct. 7, 1965, 13,838/65; Feb. 10, 1966, 1,932/66
Int. Cl. H02j 1/00, 3/00
U.S. Cl. 307—85                                     8 Claims

ABSTRACT OF THE DISCLOSURE

A rotary transformer for interconnecting two alternating current systems of approximately the same frequency comprises a nonsynchronous machine in which the stator winding is electrically connected to one system while the poled rotor winding of preferably not more than four poles is electrically connected to the other system. The rotor is mechanically coupled to an auxiliary machine such as a direct current motor or a squirrel cage motor which drives the rotor of the nonsynchronous machine at a speed equal to the difference in frequency of the two systems.

---

Figure 1:
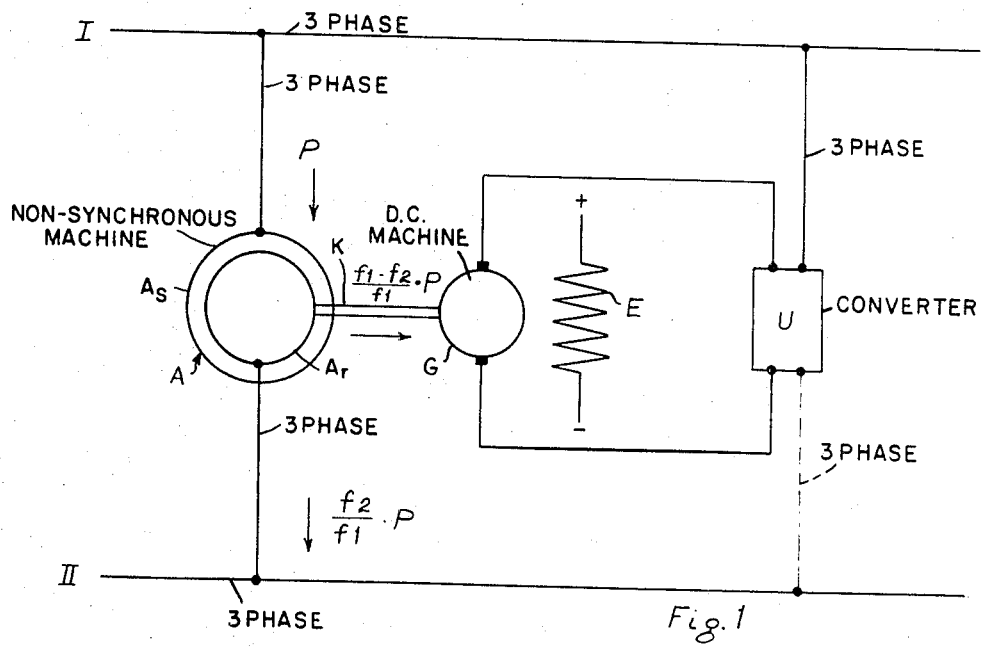

The standard type of rotary transformer for coupling, i.e., interconnecting alternating current networks or systems consists of an alternating current synchronous machine which is connected to one system and coupled with a non-synchronous machine that is connected to the other system. A commutator machine, for instance Scherbius or Lydall machine, is arranged in cascade with the nonsynchronous machine and serves to transmit the slip power without loss and to control the active and reactive power of the nonsynchronous machine. Generally it is coupled to the nonsynchronous machine; it can, however, also be arranged separately and coupled to an auxiliary machine. Such a rotary transformer is very suitable for interconnecting a single-phase 16²/3 c./s. railway system with a three-phase 50 c./s. industrial system.

Naturally, such a rotary transformer can also be used when two systems having the same frequency for example 50 c./s. or 60 c./s. or frequencies only slightly deviating from these, have to be connected together. The equipment is then, however, large and costly, because the two machines, namely the synchronous and nonsynchronous machine, have to be dimensioned for the full through power. Furthermore, both machines have losses.

The object of the invention is to avoid these disadvantages when interconnecting systems having only a slight frequency difference, by using a single machine, namely a nonsynchronous machine, the stator of which is connected to one system and the rotor to the other one. Intermediate transformers can of course be provided. When both systems are in synchronism, the nonsynchronous machine remains in the position in which the stator winding and the rotor winding are in phase with the associated systems. The nonsynchronous machine then acts like a transformer. When the actual number of turns of the rotor and stator winding correspond to the transformation ratio of the voltage of one system to that of the other system, no active or reactive power is transmitted by the nonsynchronous machine.

If the rotor is turned out of this position, active power occurs in the nonsynchronous machine, so that the nonsynchronous machine operates as a transformer. Power is transmitted from one system to the other. This power corresponds to a torque on the shaft of the nonsynchronous machine. An auxiliary machine is used for turning the rotor. It can for instance be a direct-current machine. It is assumed that such a machine is coupled to the nonsynchronous machine. The D.C. machine can for instance be fed in Ward-Leonard arrangement by rotating or stationary converters. When the D.C. machine is excited with a constant current, its armature current is a measure of its torque, according to magnitude and direction. The active power of the nonsynchronous machine is proportional to this torque. When the two systems are no longer in synchronism, the rotor of the nonsynchronous machine turns according to the frequency difference. The terminal voltage of the D.C. machine varies proportionally with its speed. The direct-voltage supply has therefore to be increased correspondingly. Two functions can be performed by the D.C. machine:

(a) Starting: In order to put the rotary transformer into operation, first of all the stator or rotor of the nonsynchronous machine is switched in. Then the rotor is turned by the D.C. machine in such a manner that the voltage vector of the still disconnected part of the nonsynchronous machine is in phase and synchronism with the associated system vector, whereupon switching-in can occur. This synchronisation can of course be achieved automatically.

(b) Power regulation: The armature current of the D.C. machine is proportional to the through power of the rotary transformer. It is used according to the invention for correcting the power in dependence on the magnitude and direction.

Instead of a D.C. machine, it is possible to use a nonsynchronous machine preferably with a squirrel-cage rotor. There are various possibilities as regards supplying the nonsynchronous machine, for instance by way of a low-frequency Scherbius machine or a static converter. In any case it is an advantage to control the nonsynchronous machine in such a manner that its flux is constant, so that by regulating its current it is possible to regulate the power of the converter. The auxiliary machine can also be constructed as a synchronous machine.

A particular advantage of this new rotary transformer is that only a single machine has to be provided for the through rating and not two machines as has hitherto been the case. The efficiency is very high. A further advantage is the low speed of the transformer. It corresponds to the frequency difference of the two systems. The centrifugal forces acting on the rotor winding are thus small, generally negligible. The rotor can therefore have a large diameter and no difficulties are encountered as regards fixing the winding, so that it can be constructed practically like a stator winding.

The new rotary transformer can be constructed for hitherto unattained powers, for instance 200 to 300 mw. and more. In accordance with the invention the number of poles is chosen as small as possible, for instance 2 or possibly 4. It is assumed for instance that the power is 300 mw., the frequency 60 c./s. and $2p=2$. A turbo generator with such a power rating would have a rotor diameter of 1000 mm., where the centrifugal forces are already excessively high. For the rotary transformer the diameter can be much higher without taking any risks, for instance 2000 mm. or more. In such a rotor the winding can be readily located. The laminated core and the stator and rotor winding can easily be coded by modern means, for instance hydrogen gas or a liquid (e.g., water or oil). Water is preferable on account of its excellent cooling effect. Sealing problems hardly exist, because the moving part rotates very slowly.

Current is supplied to the rotor winding by way of slip rings. Brushes having a low resistance, for instance with a high copper content, can be used because the frictional losses are very small at the low speed. The low peripheral speed of the slip rings results in a very small brush wear. It is therefore possible to select a high voltage for the slip rings, for instance about 10,000 volts or more. The leakage paths between the slip rings can be enlarged and separating walls provided. With a low speed, it is even possible to achieve a complete insulating separation, when a fixed part is allowed to be in direct sliding contact with a rotating part.

The power of the auxiliary machine in the embodiment of the invention under consideration would with a maximum difference of 2% between the frequencies of both systems amount to 300,000×0.02=6000 kw. The maximum speed would be 2% of the synchronous speed, that is 3600×0.02=72 r.p.m. Such a machine can easily be designed as a direct-current-machine. It is similar to a rolling mill motor. The D.C. machine rotates in one or the other direction, depending upon the frequency difference. When the systems are in synchronism, the machine is at a standstill. The brushes then remain on the same commutator segments. This condition can last for several seconds without the commutator suffering any damage. The frequencies in both systems do not remain the same for any length of time, this being naturally on the assumption that there is no rigid coupling of the systems, a fact which does not, however, necessitate a flexible coupling. The aforementioned change in the frequency causes a rotation of the D.C. machine, so that the segments move away from underneath the brushes. There are therefore no difficulties as regards the commutator.

Figure 2:
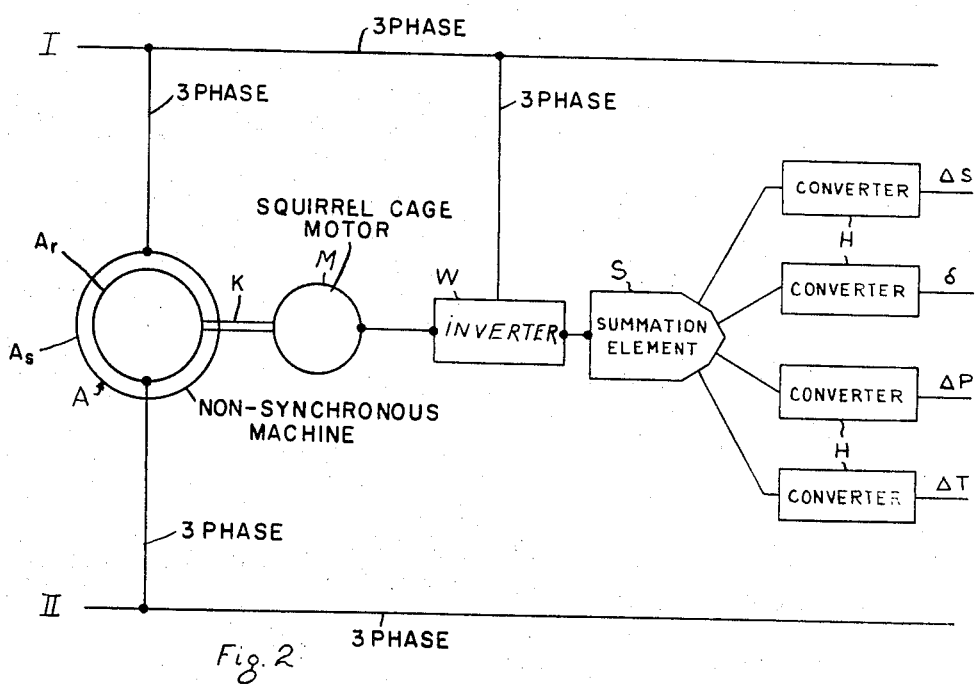

In the accompanying drawings, FIG. 1 is an electrical schematic of one embodiment of the invention which utilizes an auxiliary machine in the form of a direct current machine mechanically connected to the rotor of the nonsynchronous machine utilized for coupling the two multiphase systems; and FIG. 2 is also an electrical schematic, similar to FIG. 1, illustrating a modified embodiment wherein the auxiliary machine is also in the form of a nonsynchronous machine such as a squirrel cage motor.

The power balance account of the rotary transformer is interesting and is explained with the aid of an embodiment of the invention shown schematically in FIGURE 1. Three phase system I having a frequency $f_1$ is coupled by means of the nonsynchronous machine A with a three phase system II having a frequency $f_2$. The stator winding $A_s$ of machine A is connected to system I. The rotor $A_r$ of this machine is electrically connected to system II and is also by means of a drive shaft K mechanically coupled to the rotor of a direct-current machine G having an excitation winding E. The D.C. machine is supplied by way of a converter U which is connected either to system I or system II, whereby by means of a changeover switch it is possible to change this connection as desired.

The following calculation does not take any losses into account for the sake of simplification.

A power P flows from system I into the stator winding. The rotor $A_r$ of the nonsynchronous machine rotates with a speed $$n = \frac{60}{p}(f_1 - f_2)$$

$p$ being the number of pole pairs. When $f_1 = f_2$, $n = 0$; that is, the rotor is at a standstill. The synchronous speed of the stator $A_s$ is $$n_s = \frac{60}{p} f_1$$

and the slip of the nonsynchronous machine $$s = \frac{n_s - n}{n} = \frac{f_2}{f_1}$$

The slip power $$s \times P = \frac{f_2}{f_1} \times P$$

flows into system II. The difference between P and $s \times P$, that is $$\frac{f_1 - f_2}{f_1} \times P$$

flows through the direct-current machine into system I or II, depending on the connection. When the power flow reverses, the arrows are also reversed, moreover when $f_2 > f_1$.

Based on the conditions shown in FIGURE 1, a phase rotation in the rotor in the direction of rotation of the stator field, that is in a mechanical sense, results in a power increase, a phase rotation in the opposite direction produces a power reduction. In the embodiment described, two 60 c./s. systems were connected. Naturally the conclusions which have been reached also apply when two 50 c./s. systems are coupled together. At exactly 50 c./s. or 60 c./s., the rotary transformer does not then stand still, but rotates according to the slip. This speed is, however, only 20% of the synchronous speed when the 50 c./s. system is connected to the stator, or 16⅔% of the synchronous speed when the 60 c./s. system is connected to the stator.

In the example shown in FIGURE 1, the auxiliary machine is a direct-current machine. As already mentioned, it can also be a nonsynchronous or a synchronous machine. A smaller type of machine can be used when its speed is increased, for instance by using a speed gear.

The reactive power transmission can be altered by varying the transmission ratio between the voltage of both systems. The exchange of reactive power is controlled by altering the transformation ratio of one or more transformers which are connected either between the stator and one system or between the rotor and the other system.

Since it is not possible to produce reactive power with the rotary transformer, then in parallel with it the reactive power is improved or regulated by a phase shifter or a capacitor battery on one or the other system.

The rotary transformer performs a rotational movement corresponding to the frequency difference of both systems and this is very small. The current transfer for certain elements of the machine set can be achieved by various means. Primarily, brushes are used which are in sliding contact with the movable parts. Movable parts used for the current transfer are therefore the slip rings of the rotary transformer or the commutator of the direct-current machine which serves as the auxiliary machine previously referred to.

When the systems are in synchronism with each other for a time and the through power of the rotary transformer is maintained constant, then the brushes will remain in the same position on the slip rings and commutator respectively. The contact points can thus attain an excessive temperature. As a result, the slip rings may become deformed and structural changes in the material can occur. This also applies to the commutator of the auxiliary machine where its segments can suffer a radial displacement or be destroyed due to overheating. Slip ring and commutator may be deformed and furthermore the brushes may be damaged.

The aforementioned disadvantage is avoided by causing the brushes to be moved back and forth. It is an advantage if the brushes are not always displaced to the same end positions. This can be achieved by using a device such as has for instance been described in United States Patent No. 3,118,318. This device serves to produce a periodic rotary motion of those parts of the machine on which the brushes are mounted, for instance the brush bridge. The brush bridges are connected with the output shaft of a differential gearing that changes their position, whereby an input shaft to this gearing is equipped with means for altering the central position of the brush bridge, a second input shaft to this gearing provided with means for effecting a periodic back and forth rotation with variable amplitude.

As regards the slip rings of the nonsynchronous machine, the brush bridge is caused to oscillate and flexible connections are provided for the brush holder. In the case of the commutator of the driving motor, its stator together with the brush bridge is caused to perform a back and forth movement and flexible leads are used for the connection to the stator.

The nonsynchronous machine of the rotary transformer has no damping such as a synchronous machine with its damping winding or due to its solid poles and pole shoes. Oscillations can therefore occur in the rotary transformer which become noticeable in the form of power oscillations with reference to the prescribed value. Particularly when the ohmic resistance of a network is relatively high, an instability can occur, so that the rotary transformer has to be switched out. When the auxiliary machine is for instance a squirrel-cage motor which is supplied from controlled rectifiers, its shunt characteristic, that is speed-torque characteristic, has a stabilizing effect, but this is generally not sufficient.

A further object of the invention is thus to achieve an adequate damping, which is independent of the type of auxiliary machine used. In accordance with the invention this is realised in that the oscillations are damped by controlling the auxiliary machine by means of a measured value of the nonsynchronous machine which is introduced into the regulating circuit of the auxiliary machine.

FIG. 2 illustrates a schematic arrangement for stabilizing the rotary transformer. The nonsynchronous machine is indicated by A, its stator winding $A_s$ being connected to system I and its rotor winding $A_r$ to system II. The rotor is rigidly coupled for instance to a squirrel-cage motor M and is supplied from system I by way of an inverter W.

A measured value of the machine A is used for stabilization, its deviation from the reference value being applied to the regulating circuit of the auxiliary machine. For this purpose such measured values are used as the powers ($\Delta P$) of the rotary transformer, the torque ($\Delta T$) of the nonsynchronous machine A, the slip ($\Delta s$) of the latter, which corresponds to the speed deviation from the stationary rotor speed, and the load angle ($\delta$), which describes the displacement of the rotor from the phase position corresponding to no-load to the phase position corresponding to the desired torque. These measured values are converted by a measurand converter H into corresponding electric signals and supplied by way of a common summation element S to the inverter W for the purpose of regulating the motor M.

Since the regulating process should occur rapidly, it is expedient to obtain a derivation of the measured value as a function of the time and to use this value in the regulating circuit. One or more measured values can be utilized simultaneously in order to obtain the desired stabilization.

We claim:

1. A rotary transformer for interconnecting two multiphase alternating current systems having approximately the same frequency which comprises a nonsynchronous alternating current machine including a stator winding and poled rotor winding having a maximum of four poles, circuit means electrically connecting said stator winding to one of said systems, circuit means connecting said rotor winding to the other of said systems, and means for rotating said rotor at a speed variable with the frequency difference between the two systems, said rotor being at a standstill when the frequencies of the two systems are the same.

2. A rotary transformer for interconnecting two multiphase alternating current systems having approximately the same frequency which comprises a nonsynchronous alternating current machine including a stator winding and poled rotor winding having a maximum of four poles, circuit means electrically connecting said stator winding to one of said systems, circuit means connecting said rotor winding to the other of said systems, and an auxiliary machine in the form of an electric motor mechanically coupled to the rotor of said nonsynchronous machine for rotating said rotor and which takes over the difference between the powers of said stator and rotor windings respectively of said nonsynchronous machine and exchanges it practically loss-free with at least one of said systems, said auxiliary machine being provided with means for controlling the power of said rotary transformer.

3. A flexible rotary transformer as in claim 2, characterised in that the auxiliary machine is a direct-current machine which has a constant excitation, so that its current is proportional to the power of the rotary transformer.

4. A flexible rotary transformer as in claim 2, characterised in that the auxiliary machine is a nonsynchronous machine which is fed from a converter that is so controlled that the flux of the nonsynchronous machine is constant.

5. A flexible rotary transformer as in claim 4, characterised in that the power of the rotary transformer is regulated by controlling the current of the auxiliary nonsynchronous machine.

6. A flexible rotary transformer as in claim 2, characterised in that the auxiliary machine is a synchronous machine.

7. A flexible rotary transformer as in claim 1, characterised in that the exchange of reactive power between the systems is controlled by altering the transformation ratio of at least one transformer connected between said nonsynchronous machine and one of said systems.

8. A flexible rotary transformer as in claim 2, characterised in that oscillations of said nonsynchronous machine are damped by controlling said auxiliary machine by means of measured values introduced into the regulating circuit of said auxiliary machine.

References Cited

UNITED STATES PATENTS

| 2,282,874 | 5/1942 | Moore et al. | 307—105 X |
| 3,302,099 | 1/1967 | Packard | 336—120 X |
| 3,214,717 | 10/1965 | Brodersen | 336—120 X |

ROBERT K. SCHAEFER, Primary Examiner

H. J. HOHAUSER, Assistant Examiner

U.S. Cl. X.R.

307—17; 318—45